(12) United States Patent
Thakkar et al.

(10) Patent No.: US 9,491,048 B2
(45) Date of Patent: Nov. 8, 2016

(54) DEVICES AND METHODS FOR FACILITATING AUTOMATED CONFIGURATION OF COMMUNICATIONS INTERFACES

(71) Applicant: QUALCOMM Incorporated, San Diego, CA (US)

(72) Inventors: Samir Bhagwandas Thakkar, San Diego, CA (US); Brian T. Duddie, San Marcos, CA (US); Billy Abele Oostra, Escondido, CA (US); Patrick James Kusbel, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 13/975,475

(22) Filed: Aug. 26, 2013

(65) Prior Publication Data

US 2014/0293886 A1    Oct. 2, 2014

Related U.S. Application Data

(60) Provisional application No. 61/806,234, filed on Mar. 28, 2013.

(51) Int. Cl.
*H04L 12/24* (2006.01)
*H04W 8/18* (2009.01)

(52) U.S. Cl.
CPC .......... *H04L 41/0803* (2013.01); *H04W 8/183* (2013.01)

(58) Field of Classification Search
None
See application file for complete search history.

(56) References Cited

U.S. PATENT DOCUMENTS

| | | | |
|---|---|---|---|
| 7,920,899 B2 | 4/2011 | Jain | |
| 8,301,196 B2 | 10/2012 | Kauffman et al. | |
| 2003/0081735 A1* | 5/2003 | Emory et al. | 379/1.01 |
| 2010/0311402 A1 | 12/2010 | Srinivasan et al. | |
| 2011/0195700 A1* | 8/2011 | Kukuchka et al. | 455/422.1 |
| 2011/0296399 A1* | 12/2011 | Tugnawat | H04W 8/183 717/174 |
| 2012/0108204 A1* | 5/2012 | Schell | H04W 8/205 455/411 |
| 2012/0231844 A1* | 9/2012 | Coppinger | G06Q 20/3278 455/558 |
| 2012/0309344 A1 | 12/2012 | Ferrazzini et al. | |
| 2013/0260711 A1* | 10/2013 | Shaikh | H04L 65/1016 455/405 |

FOREIGN PATENT DOCUMENTS

| | | |
|---|---|---|
| EP | 1971163 A2 | 9/2008 |
| EP | 2079256 A1 | 7/2009 |

OTHER PUBLICATIONS

International Search Report and Written Opinion—PCT/US2014/020591—ISA/EPO—Jul. 10, 2014.

* cited by examiner

*Primary Examiner* — Jae Y Lee
*Assistant Examiner* — Tito Pham
(74) *Attorney, Agent, or Firm* — Loza & Loza LLP

(57) ABSTRACT

Access terminals are adapted to facilitate automated configuration of communications interfaces based on a current carrier identity. According to one example, an access terminal may determine a carrier identity from a subscription module. A modem configuration associated with the carrier identity may be selected from modem configuration data stored on a storage medium accessible by the access terminal. The selected carrier-specific software configuration may then be activated to configure a communications interface of the access terminal to facilitate operations associated with the carrier identity, such as facilitating wireless communications with a carrier associated with the carrier identity. Other aspects, embodiments, and features are also included.

33 Claims, 6 Drawing Sheets

DEVICES AND METHODS FOR FACILITATING AUTOMATED CONFIGURATION OF COMMUNICATIONS INTERFACES

PRIORITY CLAIM

The present application for patent claims priority to Provisional Application No. 61/806,234 entitled "Automatic Modem Configuration and Image Selection Devices, Systems, and Methods" filed Mar. 28, 2013, and assigned to the assignee hereof and hereby expressly incorporated by reference herein as if fully set forth below in its entirety and for all applicable purposes.

TECHNICAL FIELD

The technology discussed below relates generally to wireless communications, and more specifically, to methods and devices for facilitating automated configuration of communications interfaces in wireless communication devices.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of wireless communications systems include code-division multiple access (CDMA) systems, time-division multiple access (TDMA) systems, frequency-division multiple access (FDMA) systems and orthogonal frequency-division multiple access (OFDMA) systems.

Multiple types of wireless communication devices are adapted to utilize wireless communications systems. Wireless communication devices may be generally referred to as access terminals. In some instances, an access terminal's communications interface (e.g., cellular wireless modem card) is configured for operation with a specific cellular service provider. For example, access terminals may be adapted to employ a specific cellular technology, as well as carrier-specific technical settings to access a carrier's network.

The variety of technical settings required for communications interfaces complicates the manufacture and sale of access terminals. One solution is to manufacture and sell access terminals specifically configured for particular carriers. However, this approach creates inventory challenges as an inventory of access terminals must be provisioned and stocked for each cellular carrier even though the only difference between the access terminals may be a small amount of cellular provisioning information stored on the communications interface. Since it is not possible to know in advance which carriers will attract more consumers, retailers must maintain excess inventory. Alternatively, consumers may be required to visit a physical location (e.g., a cellular carrier's store) to have the communications interface activated (i.e., programmed with provisioning data). However, this extra step is likely to generate consumer dissatisfaction. Both alternatives will also require the consumer to bring the access terminal into a physical location (e.g., a store) in order to switch to a new carrier.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate automated configuration of access terminal communications interfaces based on an identity of a carrier active in the access terminal.

According to at least one aspect of the disclosure, access terminals may include a communications interface, a storage medium including modem configuration data, and a subscription module including a carrier identity. A processing circuit may be coupled to the communications interface, the storage medium, and the subscription module. The processing circuit may be adapted to determine the carrier identity from the subscription module. The processing circuit may further be adapted to select, from the modem configuration data, a modem configuration associated with the carrier identity, and activate that modem configuration to configure the communications interface to operate with a carrier associated with the carrier identity.

Further aspects provide methods operational on access terminals and/or access terminals including means to perform such methods. One or more examples of such methods may include determining a carrier identity from a subscription module. A modem configuration associated with the carrier identity may be selected from modem configuration data stored on a storage medium. The selected modem configuration may then be activated to facilitate configuration of a communications interface to operate with a carrier associated with the first carrier identity.

Still further aspects include processor-readable storage mediums comprising programming executable by a processing circuit. According to one or more examples, such programming may be adapted for causing the processing circuit to determine a carrier identity from a subscription module. The programming may further be adapted for causing the processing circuit to select a modem configuration associated with the carrier identity from modem configuration data stored on a storage medium, and to activate the selected modem configuration to configure a communications interface to facilitate operations associated with the carrier identity.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for one or more specific protocols and systems, and related terminology may be found in much of the following description. However, those of ordinary skill in the art will recognize that one or more aspects of the present disclosure may be employed and included in one or more other wireless communication protocols and systems.

Figure 1:
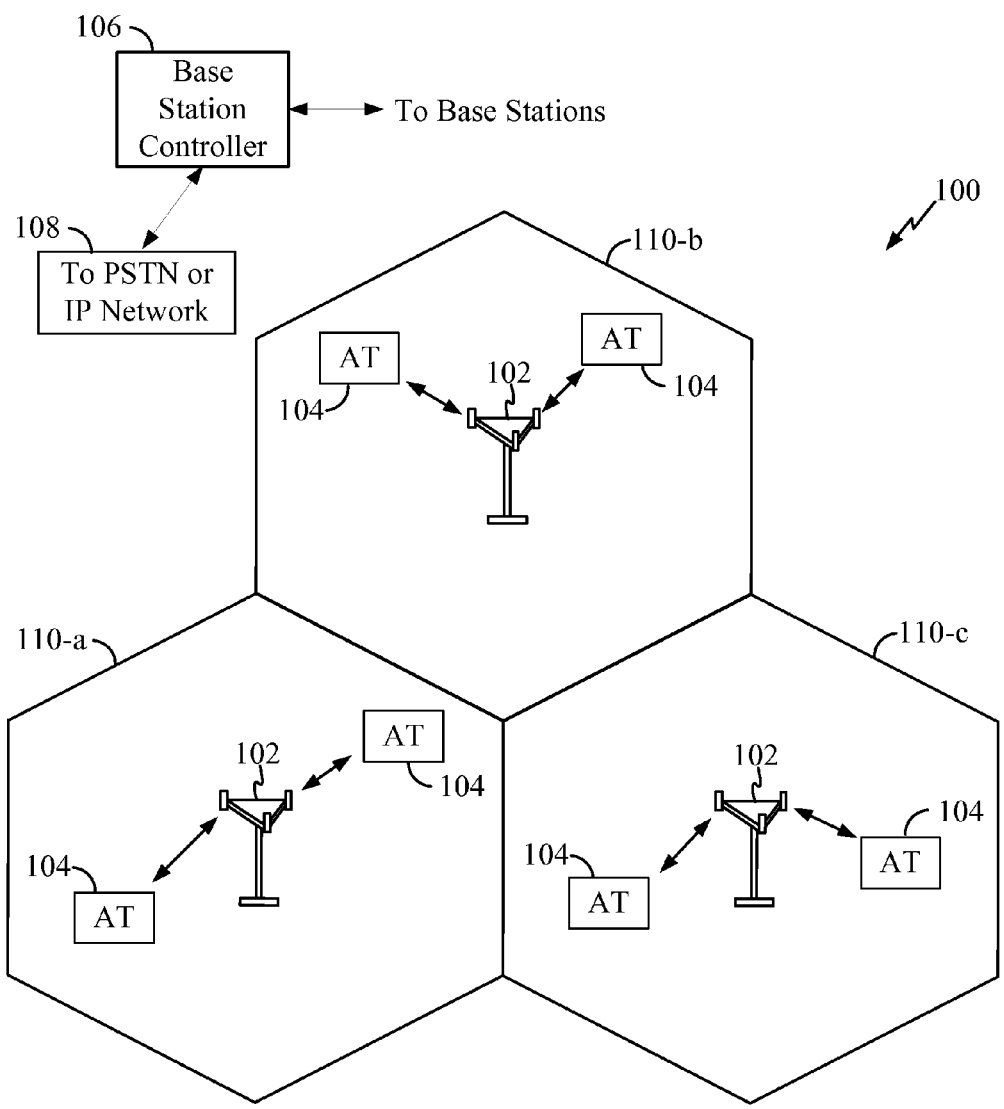
FIG. 1 is a block diagram of a network environment in which one or more aspects or embodiments of the present disclosure may find application.

Referring now to FIG. 1, a block diagram of a network environment in which one or more aspects of the present disclosure may find application is illustrated. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In various examples, the system 100 may include base stations 102 of different types.

One or more access terminals 104 may be dispersed throughout the coverage areas 110. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, an automobile, an entertainment device, display board, display screen, and/or other communication/computing device which communicates, at least partially, through a wireless or cellular network.

To actively communicate within the wireless communications system 100, each access terminal 104 is typically provisioned for a specific carrier. That is, a communications interface for each access terminal 104 is typically configured to operate with a specific carrier. A carrier, which may also be referred to as a wireless service provider, refers to an entity that typically receives payments from subscribers for wireless voice and data communication services. In North America, some examples of carriers include AT&T, Rogers, Sprint, T-Mobile, and Verizon Wireless.

In some instances, a user may have a separate service that uses the same infrastructure and base stations deployed by the carriers. For example, when an access terminal is employed in an automobile, an automotive service provider may offer to provide in-vehicle subscription services, such as for example, voice communication and calling, navigation, security, and diagnostics. Typically, a subscriber pays the automotive service provider, but the automotive service provider relies on the same infrastructure and base stations deployed by local carriers.

Often, an access terminal manufacturer produces access terminals 104 to include all the necessary circuitry, software, and configurations to connect to the wireless communications system 100 for a specific carrier with minimal or no manual interaction by a user. For instance, a manufacturer may desire to employ a communications interface adapted to connect with a particular carrier "out-of-the-box."

Most carriers employ closed systems, in which access to their network is regulated by tightly controlled provisioning data, and most access terminals 104 must be programmed for use with a particular carrier before it can operate within the communications system 100. That is, a communications interface in an access terminal 104 typically must be provisioned (or configured) with special data that is unique to a particular cellular system carrier before it can operate in the communications system 100 with that carrier.

The provisioning information, which may also be referred to herein as a modem configuration, that is typically implemented by a communications interface of an access terminal 104 includes various data. This data can include information employed by the communications interface to access the network, identifiers to be transmitted by the communications interface to the network, and information to enable the communications interface to connect to cellular networks no matter where they are located. In some scenarios, the communications interface may be informed of the frequencies and access codes for connecting to a particular carrier's network. The communications interface may also be programmed with identification codes that will be transmitted to the carrier's network so that the carrier will recognize the access terminal 104 as authorized to access the network.

In addition to subscription related data, provisioning information (modem configuration) may also include feature flags and definitions that activate features and applications on the access terminal 104 by setting particular variables to specific values. For example, one carrier may choose to support a particular optional feature in a 3 G or 4 G standard (or other standards), and does so by setting associated flags and data values in the provisioning. A second carrier that chooses not to support that optional feature would include in its provisioning data a different set of flags and data associated with this feature. Furthermore, each carrier may employ different revisions of wireless standards being deployed on their network.

Provisioning information is typically stored in nonvolatile memory accessible by the communications interface. This ensures that the essential provisioning information is available to the communications interface for connecting to one or more networks. As such, provisioning information may be said to contain a variety of NV (or configuration) items. Each NV item may contain a value or array of data. Each NV item may be utilized by the carrier to perform a function or feature set.

In addition to a carrier's unique provisioning information, cellular networks employ different technologies including, for example, Code Division Multiple Access (CDMA) and the Universal Mobile Telecommunications Service (UMTS) technologies. While a single communications interface of an access terminal 104 can be designed with circuitry enabling it to connect to either a CDMA or UMTS technology network, these different technologies may employ different modem configurations even when the same carrier is supporting both network technologies.

Without proper modem configuration, an access terminal 104 cannot access the carrier's network, and thus may not be able to access the cellular network "out-of-the-box." Furthermore, once an access terminal 104 is provisioned for a particular carrier, it may be relatively difficult to reconfigure the access terminal 104 for use with a different carrier.

For instance, if a mobile phone, laptop computer, tablet computer, automobile, or other such access terminal 104 is provisioned for use with a specific carrier, a user desiring to change carriers typically must either replace the device itself, manually change the carrier provisioning, or take the device to a service provider's location where the device can be reprogrammed. Some access terminals 104, such as automobiles, are not typically replaced nearly as frequently as other access terminals, such as mobile phones. In the example of an automobile, when an automotive service provider wishes to switch carriers for its subscribers, because the hardware is frequently integrated into the automobile itself, the replacement of hardware to enable switching carriers is not practical. Thus, to switch carriers, the automobile is typically brought in to a dealer or auto shop, where the automobile may be serviced (e.g., by plugging in a USB or other hard-wired interface) to reconfigure the communications interface for the new carrier.

According to at least one aspect of the present disclosure, access terminals are adapted to switch to different modem configurations to operate with a particular carrier desired by the user. That is, aspects of the present disclosure provide for access terminals with a communications interface having multimode or multi-carrier capabilities, where selection of one modem configuration from a plurality of modem configurations may be automatically accomplished without the need for user interaction. In various examples, the access terminal is adapted to select the particular modem configuration based on a carrier identifier associated with the access terminal.

Figure 2:
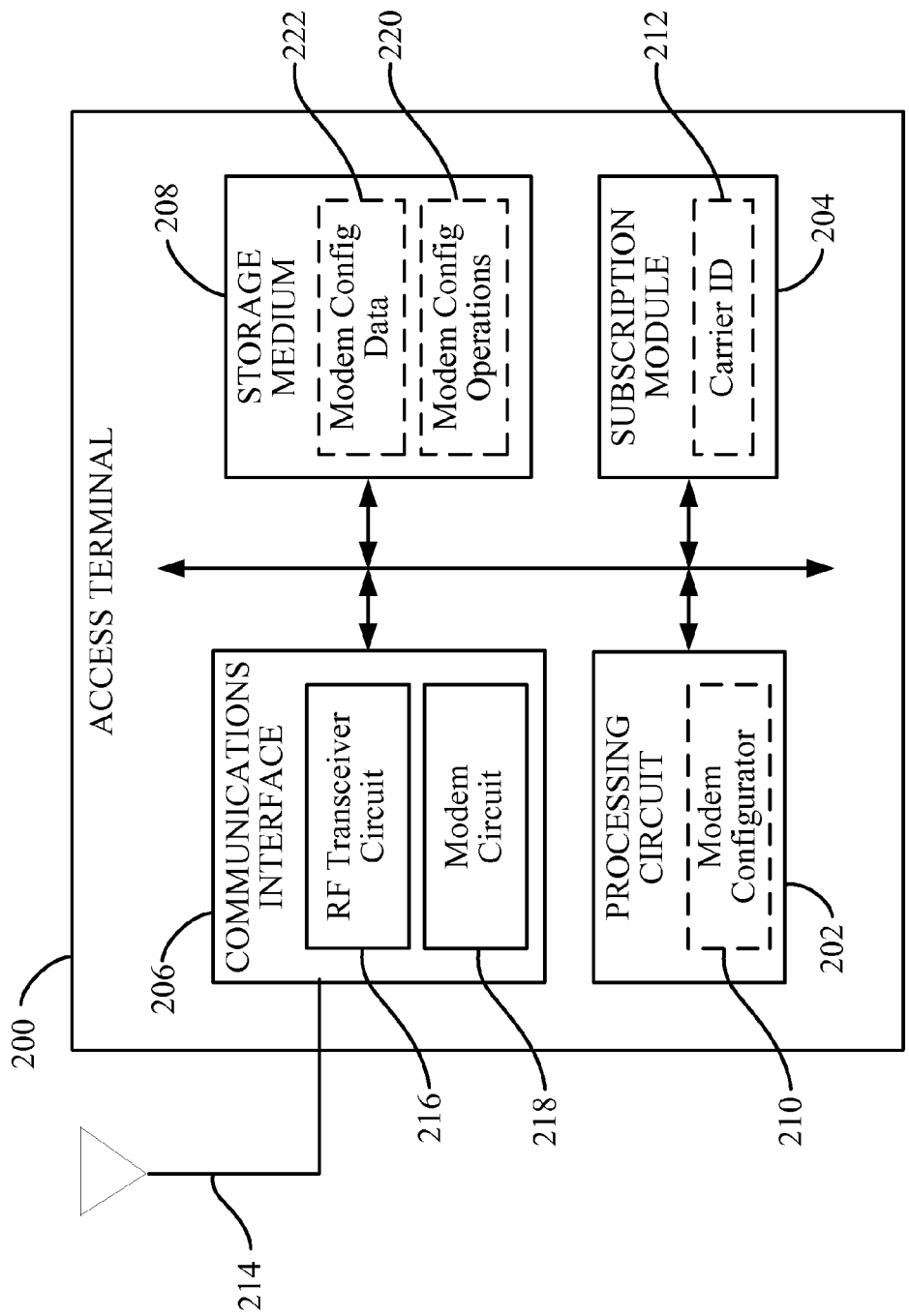
FIG. 2 is a block diagram illustrating select components of an access terminal according to some embodiments.

Turning to FIG. 2, a block diagram is shown illustrating select components of an access terminal 200 according to at least one example of the present disclosure. The access terminal 200 includes a processing circuit 202 coupled to or placed in electrical communication with a subscription module 204, a communications interface 206, and a storage medium 208.

The processing circuit 202 is arranged to obtain, process and/or send data, control data access and storage, issue commands, and control other desired operations. The processing circuit 202 may include circuitry adapted to implement desired programming provided by appropriate media in at least one example. For example, the processing circuit 202 may be implemented as one or more processors, one or more controllers, and/or other structure configured to execute executable programming. The processing circuit 202 may include more than one portion located within different circuits or modules of the access terminal 200. For example, a portion of the processing circuit 202 (e.g., a first processor) may be located within the communications interface, and another portion (e.g., a second processor) located in another portion of the access terminal 200. For simplicity, various portions of the processing circuit 202 are depicted as a single block in the present disclosure.

Examples of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 202 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 202 are for illustration and other suitable configurations within the scope of the present disclosure are also contemplated.

The processing circuit 202 is adapted for processing, including the execution of programming, which may be stored on the storage medium 208. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 202 may include a modem configurator 210. The modem configurator 210 may include circuitry and/or programming (e.g., programming stored on the storage medium 208) adapted to determine a carrier identity, and to select and implement appropriate modem configurations for the communications interface 206 to facilitate wireless connectivity with the determined carrier.

The subscription module 204 may include a removable or fixed (e.g., embedded) module that includes various subscription details, including a carrier identifier (ID) 212. The subscription module 204 may be implemented as one or more of a Subscriber Identity Module (SIM), User Identity Module (UIM, R-UIM), Universal Integrated Circuit Card (UICC), CDMA Subscriber Identity Module (CSIM), Universal Subscriber Identity Module (USIM)), or other similar identity module including a carrier ID 212.

The carrier ID 212 is generally adapted to indicate the identity of a particular carrier associated with the subscription module 204. This is typically the carrier with which the access terminal 200 will be adapted to use for wireless communications. According to various examples, the carrier ID 212 may be an Issuer Identification Number (IIN), a Public Land Mobile Network (PLMN) ID, and/or an International Mobile Subscriber Identity (IMSI), as well as additional or alternative information in the subscription module 204 according to other examples of the present disclosure.

In at least one example, the subscription module 204 may be a User Identity Module (UIM, R-UIM). This is a conventional module developed for 3GPP2 CDMA access terminals and which can additionally include capabilities for dual compatibility with 3GPP GSM networks. Among other information, a UIM includes a unique serial number called the Integrated Circuit Card Identifier (ICCID). The structure of the ICCID is standardized by the International Telecommunications Union (ITU).

According to the standards, the first 4-7 digits of the ICCID contain a carrier ID 212 in the form of the Issuer Identification Number (IIN). The ICCID includes a 2-digit major industry identifier (always taking the value 89 for telecommunications), a 1-3-digit country code identifying the country in which the wireless service provider provides service, and the 1-4-digit IIN. The ITU maintains a list of registered IINs, maintained at http://www.itu.int/pub/T-SP-OB.971-2011 (ITU Operational Bulletin No. 971). By way of an example, the ICCID used by Carrier X may be 89112300000012345678. This includes the industry identifier (89), the country code (1), and the IIN (123) assigned to Carrier X by the ITU. In this case, the IIN alone would be sufficient to identify Carrier X as the carrier.

In some examples, the carrier ID 212 may include a Public Land Mobile Network (PLMN) ID. The PLMN ID includes a mobile country code (MCC) and a mobile network code (MNC) that can be used to identify a carrier.

In some examples, the carrier ID 212 can include an International Mobile Subscriber Identity (IMSI) associated with the subscription module 204. For instance, each carrier is often provided as a block or range of IMSIs to assign to subscribing customers. Accordingly, an IMSI that falls within a particular range may be identified as being associated with a particular carrier. By way of example, Carrier X may be provided IMSIs 123123000095000 through 123123000098999, while Carrier Y may be provided IMSIs 123123000099000 through 123123000126499. Thus, if the IMSI falls within the range associated with Carrier X, then the IMSI employed as the carrier ID 212 indicates that the carrier is Carrier X. On the other hand, if the IMSI falls within the range associated with Carrier Y, then the IMSI employed as the carrier ID 212 indicates that the carrier is Carrier Y.

The communications interface 206 is configured to facilitate wireless communications of the access terminal 200. For example, the communications interface 206 may include circuitry and/or programming adapted to facilitate the communication of information bi-directionally for a particular carrier. The communications interface 206 may be coupled to one or more antennas 214, and include wireless (RF) transceiver circuitry 216 and modem circuitry 218. The RF transceiver circuitry 216 includes circuitry for sending and receiving radio frequency signals to/from a carrier network. The modem circuitry 218 may be configured to encode digital data into radio frequency signals for transmission, and translate received radio frequency signals into digital data that can be interpreted by at least a portion of the processing circuit 202.

According to at least one aspect of the present disclosure, the communications interface 206 may be configurable to operate on any of a variety of carriers, for any of a variety of technologies. For instance, the access terminal 200 may employ a chipset or module such as Qualcomm's GOBI which includes a processing circuit 202 with multiple processors in addition to signal generator and modem circuits. Such a configuration enables the communications interface 206 to be definable by software (e.g., software defined radio). Such a software defined radio based communications interface 206, generates, encodes/decodes, and modulates/demodulates data signals within a portion of the processing circuit 202 implemented as a programmable digital signal processor (DSP). The programmable DSP enables communication signals to be defined by software to conform with the wave form, frequency and data packet requirements of any communication technology (e.g., GSM/UMTS, CDMA). By re-programming the DSP to generate signals with different characteristics, the communications interface 206 may be made to generate a communication signal that is compatible with any carrier's unique communications network. Thus, an access terminal 200 equipped with a software defined radio based communications interface 206 may subscribe to any carrier for communications support regardless of communication technology required.

The storage medium 208 may represent one or more computer-readable, machine-readable, and/or processor-readable devices for storing programming, such as processor executable code or instructions (e.g., software, firmware), electronic data, databases, or other digital information. The storage medium 208 may also be used for storing data that can be manipulated by the processing circuit 202 when executing programming. The storage medium 208 may be any available media that can be accessed by a general purpose or special purpose processor, including portable and/or fixed storage devices, optical storage devices, and/or various other mediums capable of storing, containing and/or carrying programming. By way of example and not limitation, the storage medium 208 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 208 may be coupled to the processing circuit 202 such that the processing circuit 202 can read information from, and write information to, the storage medium 208. That is, the storage medium 208 can be coupled to the processing circuit 202 so that the storage medium 208 is at least accessible by the processing circuit 202, including examples where the storage medium 208 is integral to the processing circuit 202 and/or examples where the storage medium 208 is separate from the processing circuit 202 (e.g., resident in the access terminal 200, external to the access terminal 200, distributed across multiple entities). Although the storage medium 208 is depicted as a single block, it should be understood that the storage medium 208 may include a plurality of separate storage mediums located in different physical locations and/or even coupled to different portions of the processing circuit 202. For example, a nonvolatile storage medium of the storage medium 208 may be associated with the communications interface, while one or more other storage mediums may be associated with other components and/or positioned in other distinct locations.

Programming stored by the storage medium 208, when executed by the processing circuit 202, causes the processing circuit 202 to perform one or more of the various functions and/or process steps described herein. For example, the storage medium 208 may include modem configuration operations 220 adapted to configure the communications interface 206 to operate according to a specific configuration associated with the carrier ID 212. For instance, the modem configuration operations 220 may cause the processing circuit 202 to identify the carrier ID 212, and to select a particular modem configuration from the modem configuration data 222 to cause the communications interface 206 (e.g., the modem circuit 218) to operate on the identified carrier, as described herein. Thus, according to one or more aspects of the present disclosure, the processing circuit 202 is adapted to perform (in conjunction with the storage medium 208) any or all of the processes, functions, steps and/or routines for any or all of the access terminals described herein. As used herein, the term "adapted" in relation to the processing circuit 202 may refer to the processing circuit 202 being one or more of configured, employed, implemented, and/or programmed (in conjunction with the storage medium 208) to perform a particular process, function, step and/or routine according to various features described herein.

As illustrated in FIG. 2, the storage medium 208 further includes modem configuration data 222. The modem configuration data 222 includes data adapted to configure the communications interface 206 (e.g., the modem circuit 218) for operation with a specific carrier. According to an aspect of the present disclosure, a modem configuration may be automatically activated from the modem configuration data 222 by the processing circuit 202 executing the modem configuration operations 220 to enable communications with a different carrier network Various examples of generating modem configuration data 222 and activating the proper modem configuration from the modem configuration data 222 are described in U.S. patent application Ser. No. 12/431,050 (U.S. Pat. No. 8,453,140) and Ser. No. 12/787,955 (US PGPUB 2011/0296399-A1), the disclosures of which are hereby incorporated by reference as if fully set forth herein in their entireties.

Figure 3:
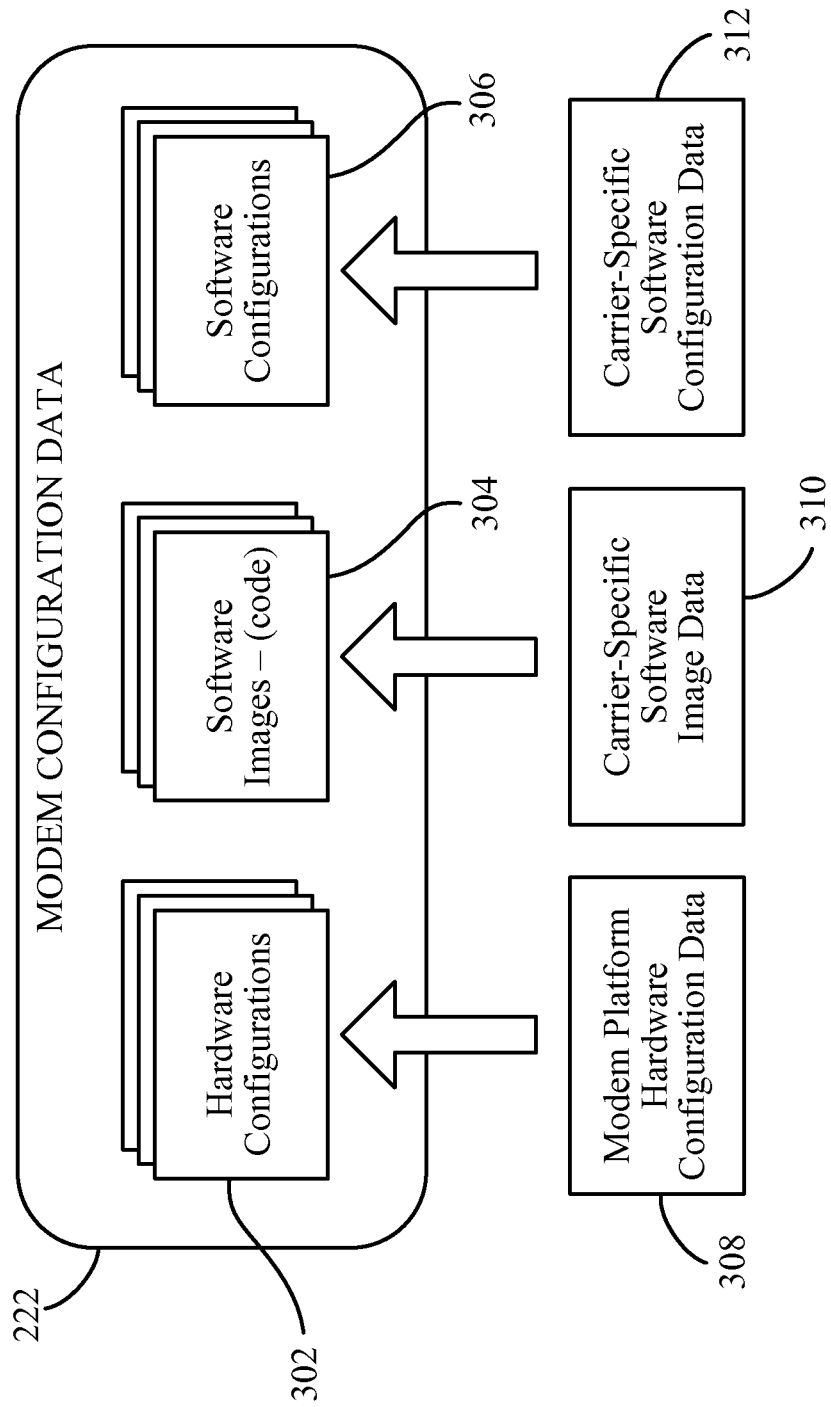
FIG. 3 is a block diagram illustrating select components of the modem configuration data of FIG. 2 according to some embodiments.

FIG. 3 is a block diagram illustrating select components of the modem configuration data 222 according to at least one example. In general, the modem configuration data 222 may include one or more hardware configurations 302, one or more software images 304, and/or one or more software configurations 306.

A hardware configuration 302 can be generally adapted to configure the communications interface 206 for a specific hardware implementation. In examples where the modem configuration data 222 includes a plurality of hardware configurations 302, the hardware configurations can be available to the access terminal 200 to enable the access terminal 200 to activate a particular hardware configuration 302 according to the specific hardware implemented by the access terminal 200. In some instances, the hardware configurations 302 can be modified as desired by updating one or more of the hardware configurations 302 and/or by loading additional hardware configurations 302. In some examples, the various hardware configurations 302 can be obtained from modem platform hardware configuration data 308. modem platform hardware configuration data 308 may include information stored in one or more locations of the storage medium 208 and/or loaded onto the access terminal 200 from another source. In one example, the modem platform hardware configuration data 308 may include a database of various configuration data stored on the storage medium 208. A database may be used to configure and/or generate the various hardware configurations 302. modem platform hardware configuration data 308 may include configuration data such as pin mappings, port mappings, power amplifier gain control settings, antenna tuning, etc. that can be implemented for respective hardware implementations.

A software image 304 may be generally adapted to configure the communications interface 206 for operation with a specific carrier. In examples where the modem configuration data 222 includes a plurality of software images 304, a particular software images 304 can be activated by the processing circuit 202 to facilitate operations with a particular carrier. Accordingly, the various software images 304 can also be referred to as carrier-specific software images 304. The plurality of carrier-specific software images 304 can be obtained from carrier-specific software image data 310. Carrier-specific software image data 310 may include information stored in one or more locations of the storage medium 208 and/or loadable to the storage medium 208.

A software configuration 306 can be generally adapted to configure the communications interface 206 for operation with a specific carrier. In examples where the modem configuration data 222 includes a plurality of software configurations 306, a particular software configuration 306 can be activated by the processing circuit 202 to facilitate operations with a particular carrier. Accordingly, the various software configurations 306 can also be referred to as carrier-specific software configurations 306. The plurality of carrier-specific software configurations 306 can be obtained from carrier-specific software configuration data 312. The carrier-specific software configuration data 312 may include information stored in one or more locations of the storage medium 208 and/or loadable to the storage medium 208.

By way of example only, a carrier-specific software image 304 and/or a carrier-specific software configuration 306 may include carrier-specific provisioning information, such as frequencies and access codes for enabling the communications interface 206 to connect to a particular carrier's network, as well as identification codes that will be transmitted to the carrier's network so that the carrier will recognize the access terminal 200 as authorized to access the network. In addition, each carrier-specific software image 304 and/or carrier-specific software configuration 306 may include feature flags and definitions that activate features and applications on the communications interface 206. The carrier-specific software images 304 may also include carrier-specific features and code that may be required by the associated carrier, in addition to the carrier-specific software configuration 306. In some instances, a carrier-specific software image 304 that is separate from the carrier-specific software configuration 306 may be beneficial because a Type Approval or certification may initially be done with only a few carriers to begin with. As more carriers are enabled, there may be a need to support additional software images 304 with updated code for each carrier-specific functionality, since the earlier software image 304 may be frozen after the Type Approval. Additional and/or different information may also be included with each carrier-specific software image 304 and/or carrier-specific software configuration 306.

According to aspects of the present disclosure, the access terminal 200 is adapted to select a proper modem configuration from the modem configuration data 222 in response to the carrier identity 212. The proper modem configuration can further be activated with the communications interface 206 (e.g., the modem circuit 218) to enable the communications interface 206 to operate with the carrier associated with the carrier identity 212. A modem configuration, which may also be referred to as an carrier-specific modem configuration, includes a specific combination of modem configuration data 222 that is adapted for use with a specific carrier identity 212. For example, a modem configuration may include a specific hardware configuration 302, software image 304, and/or software configuration 306 of the modem configuration data 222 that can be activated with the communications interface 206 for operation with a carrier associated with the carrier identity 212. Accordingly, when a particular carrier identity 212 is acknowledged, the modem configuration associated with the identified carrier identity 212 can be selected and activated as the modem configuration data 222 for configuring the communications interface 206. As a result, the communications interface 206 (e.g., the modem circuit 218) can be properly configured to operate on the identified carrier's network.

Figure 4:
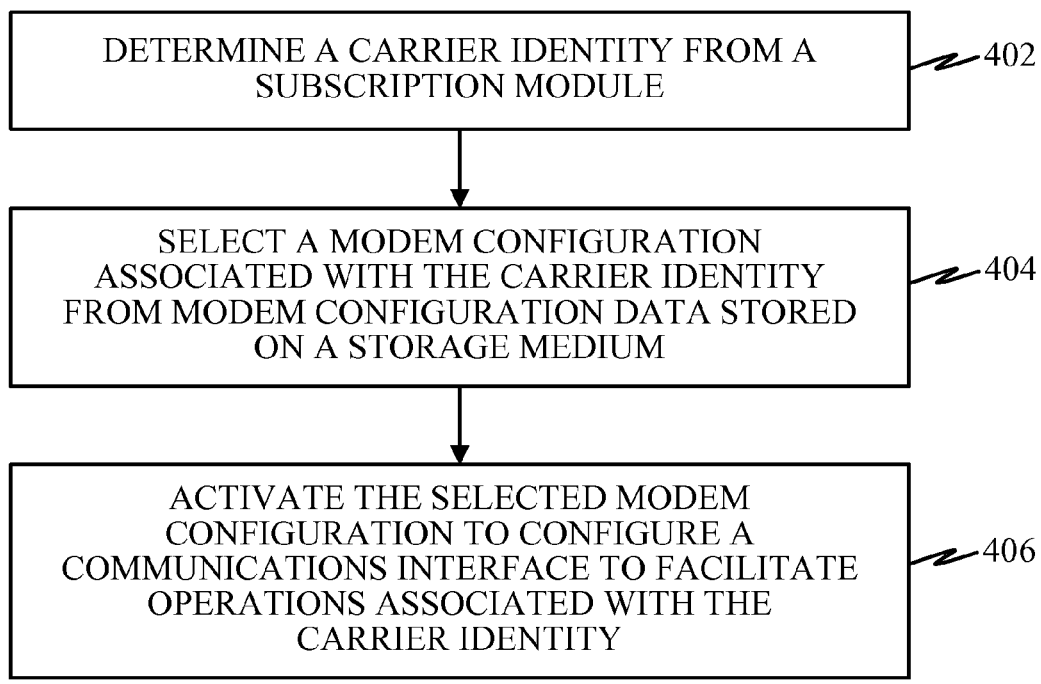
FIG. 4 is a flow diagram illustrating at least one example of a method operational on an access terminal, such as the access terminal, according to some embodiments.

FIG. 4 is a flow diagram illustrating at least one example of a method operational on an access terminal, such as the access terminal 200. Referring to FIGS. 2 and 4, an access terminal 200 can determine a carrier identity from a subscription module at step 402. For example, the processing circuit 202 (e.g., the modem configurator 210) executing the modem configuration operations 220 may determine the carrier identity 212 from the subscription module 204.

Figure 5:
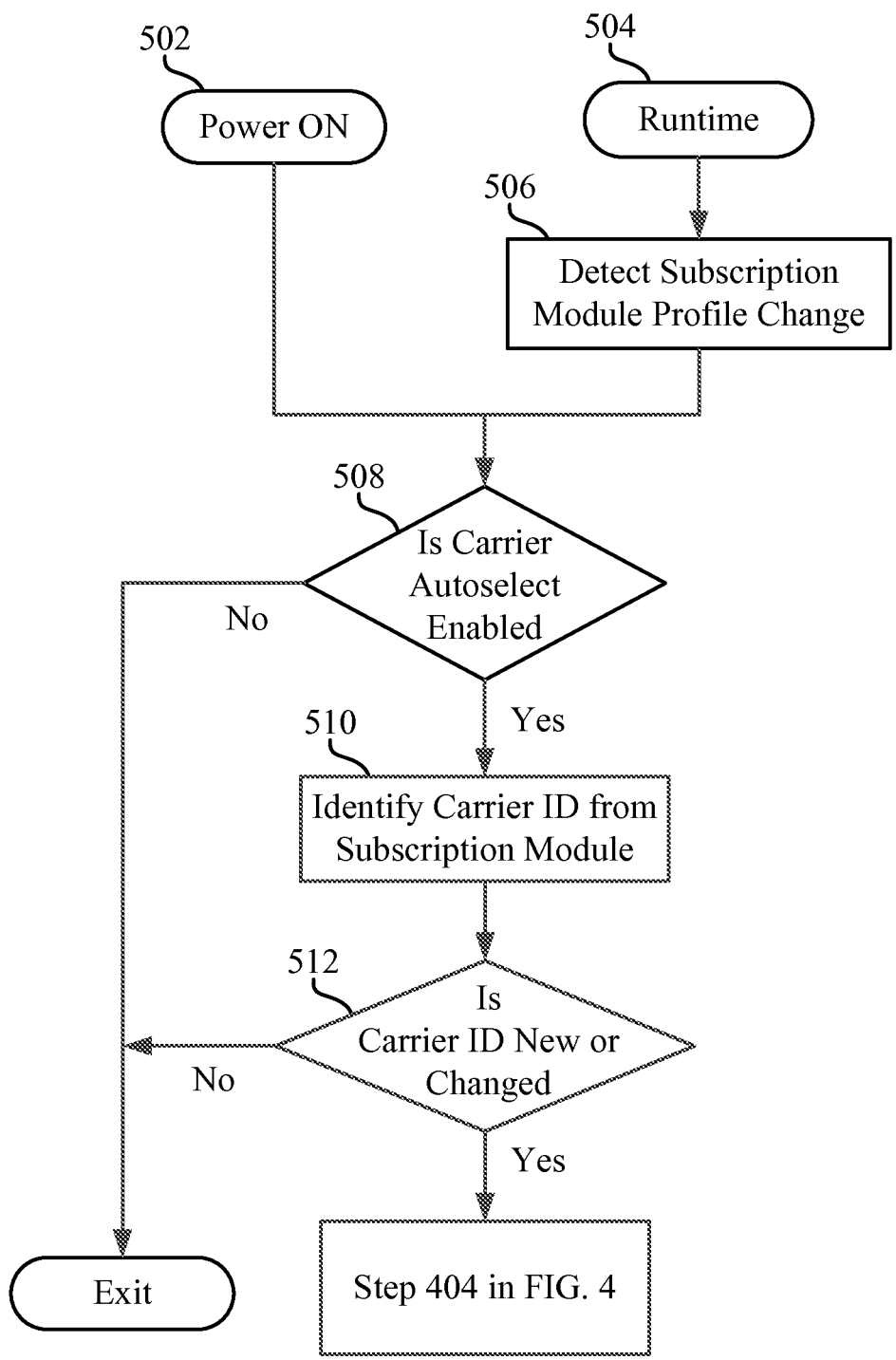
FIG. 5 is a flow diagram illustrating at least one example of an algorithm employable to determine the carrier identity from the subscription module according to some embodiments.

FIG. 5 is a flow diagram illustrating at least one example of an algorithm employed in the processing circuit 202 when executing the modem configuration operations 220 to determine the carrier identity 212 from the subscription module 204. As shown in FIG. 5, and with reference to components depicted in FIG. 2, at least two scenarios may result in the processing circuit 202 determining the carrier identity 212 from the subscription module 204. At 502, when the access terminal 200 is powered ON after being powered OFF for a period of time, the access terminal 200 is adapted to determine whether there is a new or different carrier ID 212. A new or different carrier ID 212 may occur when, for example, a subscription module 204 is inserted into the access terminal 200, whether it be the first subscription module 204 to be used with the access terminal 200 or whether it be a subscription module 204 replacing a previous or another subscription module.

On the other hand, as shown at 504, the processing circuit 202 may detect a change to a profile associated with the subscription module 204 while the access terminal 200 is actively performing runtime operations. For example, a user may remove a first subscription module 204 and insert a second, different subscription module 204 without first powering OFF the access terminal 200. In other examples, the profile for an embedded subscription module 204 may be reprogrammed, such as over the air interface or via a wired connection, while the access terminal 200 is powered ON, and a subscription module refresh including a reset of the communications interface 206 may be triggered.

In either case, whether the access terminal 200 is powered ON or has detected a change to the subscription module profile, the processing circuit 202 may determine whether the autoselection features of the present disclosure are enabled for the particular access terminal 200, as step 508. According to an aspect of the present disclosure, the autoselection features described herein can be enabled or disabled as desired. Accordingly, the processing circuit 202 may make a determination as to whether such features are enabled. If the features are not enabled, then the processing circuit 202 may exit the current algorithm shown in FIG. 5, and can also end the method of FIG. 4.

On the other hand, if the autoselection features are enabled at 508, the processing circuit 202 may identify the carrier ID 212 from the subscription module 204, at step 510. In some examples, the carrier ID 212 may include an Issuer Identification Number (IIN) included in the subscription module 204. In such instances, the processing circuit 202 may access the Integrated Circuit Card Identifier (ICCID) information to obtain the IIN therefrom. The processing circuit 202 may further identify the identity of the carrier associated with the IIN from, for example, a listing of IINs and their associated carrier.

In some examples, the carrier ID 212 may include a mobile country code (MCC) and a mobile network code (MNC) from a Public Land Mobile Network ID (PLMNID). In such instances, the processing circuit 202 may access the PLMNID of the subscription module 204 to obtain the MCC and MNC therefrom. The processing circuit 202 may further identify the carrier associated with the MCC and MNC values.

In some examples, the carrier ID 212 may include the International Mobile Subscriber Identity (IMSI). In such examples, the processing circuit 202 may access the IMSI of the subscription module 204 as well as ranges of IMSIs associated with the various carrier identities. The processing circuit 202 can then identify which carrier is associated with the range of IMSIs into which the IMSI of the subscription module 204 is located.

With the carrier ID 212 identified, the processing circuit 202 may determine at 512 whether the carrier ID 212 is new or has changed at step 512. The carrier ID 212 may be considered new if the access terminal 200 has not yet had an active subscription module 204 employed. The carrier ID 212 may be considered to be a changed carrier ID 212 if the access terminal 200 has employed a previous carrier ID 212, and the current carrier ID 212 is different from the previous carrier ID 212.

If there is no change in the carrier ID 212, even if the profile of subscription module 204 has changed, then the processing circuit 202 may simply exit the algorithm of FIG. 5, as well as end the method of FIG. 4. If, however, the processing circuit 202 determines that the carrier ID 212 is new or has changed, then the processing circuit 202 can continue to step 404 in FIG. 4.

Referring again to FIGS. 2 and 4, the access terminal 200 may select a modem configuration associated with the carrier identity from the modem configuration data stored at the access terminal 200, at step 404. For example, the processing circuit 202 (e.g., the modem configurator 210) executing the modem configuration operations 220 may select the modem configuration associated with the carrier ID 212. In particular, the processing circuit 202 (e.g., the modem configurator 210) executing the modem configuration operations 220 may select a software image 304 and/or a software configuration 306 (see FIG. 3) associated with the carrier ID 212.

Figure 6:
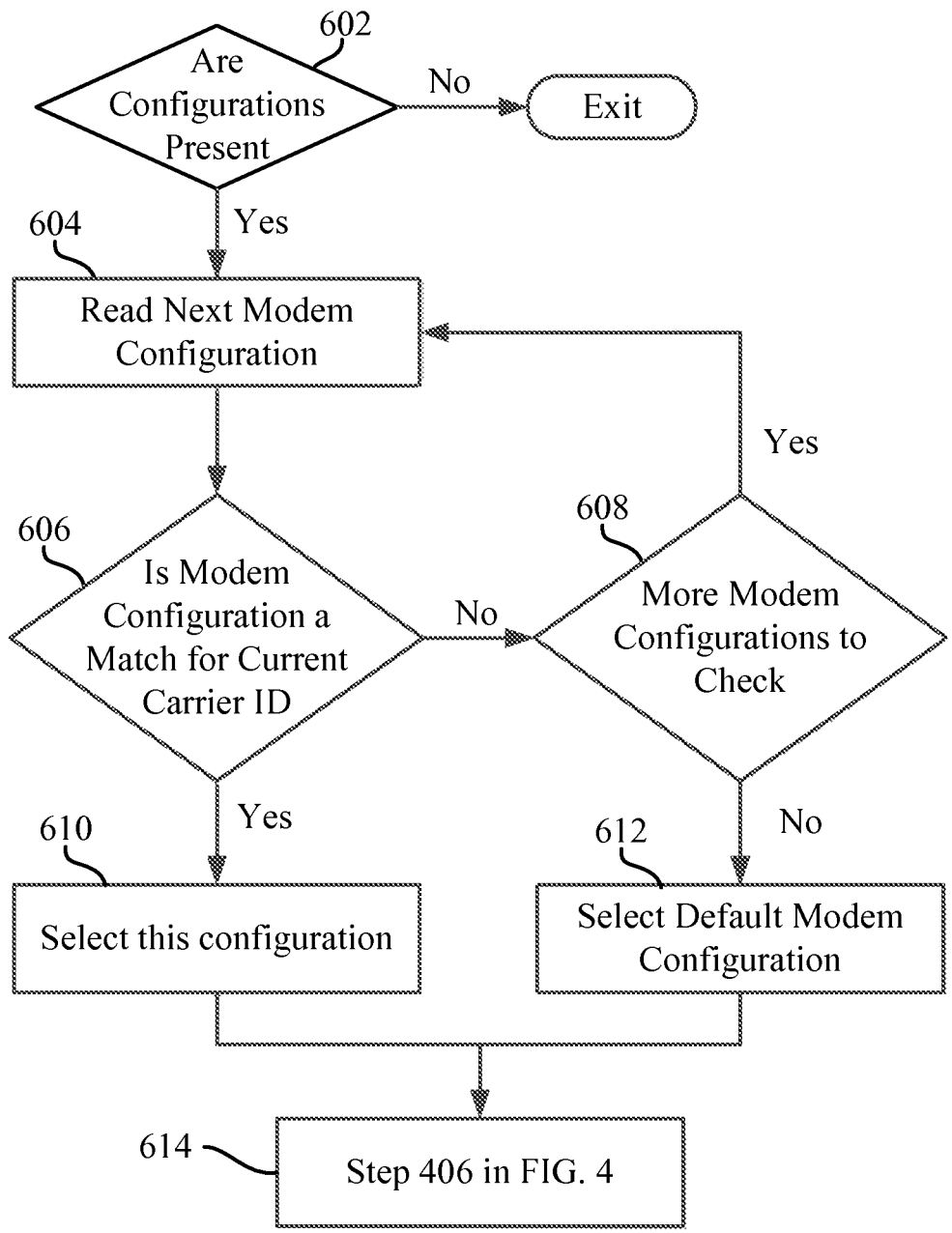
FIG. 6 is a flow diagram illustrating one example of an algorithm employable to select a modem configuration associated with a carrier identity from among a plurality of modem configurations according to some embodiments.

FIG. 6 is a flow diagram illustrating one example of an algorithm employable at the processing circuit 202 executing the modem configuration operations 220 for performing step 404 of FIG. 4. Initially, at step 602, the processing circuit 202 may determine whether there are various modem configurations available to the access terminal 200. For example, the processing circuit 202 may determine whether there are carrier-specific software images 304 and/or carrier-specific software configurations 306 (see FIG. 3) included with the modem configuration data 222 stored on the storage medium 208 or otherwise accessible to the processing circuit 202. If there are not different modem configurations (e.g., different software images 304 and/or software configurations 306) available to be searched, then the processing circuit 202 may exit the algorithm, as well as the method of FIG. 4.

On the other hand, if various modem configurations (software images 304 and/or software configurations 306) are available to the processing circuit 202, then the processing circuit 202 may begin by reading a first modem configuration at step 604. In some examples, a listing of the available modem configurations may be stored in the storage medium 208 as a table that corresponds each carrier ID to a particular modem configuration (or at least to a particular software image 304 and/or software configuration 306). A table may include a listing of software images 304 and/or software configurations 306 that are to be employed for the particular modem configuration, and/or may indicate a location in the storage medium 208 where the processing circuit 202 can find the particular software image 304 and/or software configuration 306. In other examples, the processing circuit 202 may check each individual modem configuration file (such as each software image 304 and/or software configuration 306 in FIG. 3) to identify which carrier ID(s) the modem configuration file is indicated to be associated with.

After reading a modem configuration (e.g., as listed in a modem configuration table, or the modem configuration file itself), the processing circuit 202 can determine whether the modem configuration is a match for the current carrier ID 212 of the subscription module 204, at step 606. If the modem configuration is not a match for the current carrier ID 212, then the processing circuit determines whether there are more modem configurations to check at step 608. If there are more modem configurations to check, then the processing circuit 202 can return to step 604 and read the next modem configuration.

If, at step 606, the processing circuit 202 detects a modem configuration that is associated with the carrier ID 212 of the subscription module 204, then the processing circuit 202 can select the modem configuration at step 610. On the other hand, if the processing circuit 202 goes through all the modem configurations without finding one associated with the current carrier ID 212, and determines at step 608 that there are no more modem configurations to check, then the processing circuit 202 can select a default modem configuration at step 612.

With a modem configuration selected, the processing circuit 202 can move to step 406 in the method of FIG. 4, as indicated by step 614 in FIG. 6. Referring again to FIGS. 2 and 4, the access terminal 200 may, at step 406, activate the selected modem configuration to configure the communications interface 206 to facilitate operations associated with the carrier ID. For example, the processing circuit 202 (e.g., the modem configurator 210) executing the modem configuration operations 220 may activate the selected modem configuration, which modem configuration includes a particular software image 304 and/or software configuration 306 from the modem configuration data 222. In some examples, the activation of the selected modem configuration may replace a previous modem configuration.

The modem configuration may be activated by implementing a selected modem configuration at the communications interface 206 (e.g., the modem circuit 218). Such activation can configure the communications interface 206 (e.g., the modem circuit 218) to facilitate operations associated with the carrier ID. In some instances, operations associated with the carrier ID will simply be communications with the carrier associated with the carrier ID. In other instances, operations may include other functions, such as testing operations performed by a device manufacturer.

Activating the selected modem configuration may further include rebooting or resetting the communications interface 206 to implement the new modem configuration. The rebooting/resetting can be accomplished using conventional procedures to complete reconfiguration of the communications interface 206 for performing operations associated with the carrier ID 212.

By employing one or more aspects described herein above, access terminals can automatically configure the communications interface to operate with a carrier that is currently employed by the access terminal. Thus, the access terminal can select a new modem configuration whenever the subscription module is changed to include a new carrier. As a result, an access terminal can interface and communicate with multiple terminals in a dynamic fashion.

Although examples are described above for automatically configuring the communications interface for carrier-specific operations, it should be apparent that the features described herein have further application. That is, at least some of the features described herein can be employed to automatically reconfigure the communications interface (e.g., reconfigure the hardware configuration, the software image, and/or the software configuration of the modem circuit) no matter the motivation for the reconfiguration.

For example, various features described herein may be employed by an access terminal manufacturer to perform testing to new access terminals prior to deployment with a particular carrier. In one example, the manufacturer may employ a manufacturer's subscription module including a carrier ID associated with a pre-loaded modem configuration that is intended for use in testing newly manufactured access terminals. The manufacturer's subscription module can be inserted into an access terminal. The access terminal can implement the modem configuration for testing purposes by selecting and activating a modem configuration associated with a carrier ID in the manufacturer's subscription module. After testing, the manufacturer can replace the manufacturer's subscription module with a carrier-specific subscription module, and the access terminal can automatically reconfigure the communications interface for operations with the carrier associated with the carrier-specific subscription module.

While the above discussed aspects, arrangements, and embodiments are discussed with specific details and particularity, one or more of the components, steps, features and/or functions illustrated in FIGS. 1, 2, 3, 4, 5, and/or 6 may be rearranged and/or combined into a single component, step, feature or function or embodied in several components, steps, or functions. Additional elements, components, steps, and/or functions may also be added or not utilized without departing from the present disclosure. The apparatus, devices, and/or components illustrated in FIGS. 1, 2, and/or 3 may be configured to perform or employ one or more of the methods, features, parameters, and/or steps described in FIGS. 4, 5, and/or 6. The algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
a communications interface;
a storage medium comprising modem configuration data;
a first subscription module including a first carrier identity; and
a processing circuit coupled to the communications interface, the storage medium, and the subscription module, the processing circuit configured to:
determine the first carrier identity from the first subscription module upon determining that a wireless service provider autoselection feature is enabled;
select, from the modem configuration data, a first modem configuration including a hardware configuration and a carrier-specific software image associated with the first carrier identity;
select a default modem configuration when no modem configuration associated with the first carrier identity is located; and
activate the selected modem configuration to configure the communications interface according to the hardware configuration to operate with a carrier associated with the first carrier identity.

2. The access terminal of claim 1, wherein the first carrier identity is determined from an Issuer Identification Number (IIN) included in an Integrated Circuit Card Identifier (ICCID) of the first subscription module.

3. The access terminal of claim 1, wherein the first carrier identity is determined from a Public Land Mobile Network Identifier (PLMNID) including a mobile country code (MCC) and a mobile network code (MNC) of the first subscription module.

4. The access terminal of claim 1, wherein the first carrier identity is determined from an International Mobile Subscriber Identity (IMSI) associated with the first subscription module.

5. The access terminal of claim 1, wherein the first modem configuration comprises: the carrier-specific software image and a carrier-specific software configuration, wherein the carrier-specific software image is separate from the carrier-specific software configuration.

6. The access terminal of claim 1, wherein the processing circuit is further configured to:
determine that the first subscription module has been replaced with a second subscription module including a second carrier identity that is different from the first carrier identity;
select a second modem configuration including a second carrier-specific software image associated with the second carrier identity from the modem configuration data; and
activate the second modem configuration as a replacement for the first modem configuration to configure the communications interface to operate with a carrier associated with the second carrier identity.

7. The access terminal of claim 6, wherein the processing circuit is further configured to determine at a time when the access terminal is powered ON that the first subscription module has been replaced with the second subscription module when the access terminal was powered OFF.

8. The access terminal of claim 6, wherein the processing circuit is further configured to determine that the first subscription module has been replaced with the second subscription module during a run-time operation.

9. The access terminal of claim 1, wherein a wireless service provider comprises an entity that receives payments from subscribers for wireless voice and data communication services.

10. The access terminal of claim 1, wherein the hardware configuration comprises at least one of pin mappings, port mappings, power amplifier gain control settings, or antenna tuning.

11. A method operational on an access terminal, the method comprising:
- determining a carrier identity from a subscription module upon determining that a wireless service provider autoselection feature is enabled;
- selecting a modem configuration comprising a hardware configuration and a software image associated with the carrier identity from modem configuration data stored on a storage medium;
- selecting a default modem configuration when no modem configuration associated with the carrier identity is located; and
- activating the selected modem configuration to configure a communications interface according to the hardware configuration to facilitate operations associated with the carrier identity.

12. The method of claim 11, wherein determining the carrier identity from the subscription module comprises: identifying an Issuer Identification Number (IIN) included in an Integrated Circuit Card Identifier (ICCID) of the subscription module.

13. The method of claim 11, wherein determining the carrier identity from the subscription module comprises: identifying a mobile country code (MCC) and a mobile network code (MNC) from a Public Land Mobile Network Identifier (PLMNID) associated with the subscription module.

14. The method of claim 11, wherein determining the carrier identity from the subscription module comprises:
- accessing an International Mobile Subscriber Identity (IMSI) associated with the subscription module; and
- identifying an identity of a carrier associated with a range of IMSIs including the IMSI associated with the subscription module.

15. The method of claim 11, wherein determining the carrier identity from the subscription module comprises: determining that the subscription module has replaced a previous subscription module, and that the carrier identity from the subscription module is different from a previous carrier identity in the previous subscription module.

16. The method of claim 15, wherein determining that the subscription module has replaced the previous subscription module comprises: detecting that the subscription module has replaced the previous subscription module during a run-time operation.

17. The method of claim 15, wherein activating the selected modem configuration to configure the communications interface to facilitate operations associated with the carrier identity comprises:
- replacing a previous modem configuration with the selected modem configuration, wherein the previous modem configuration is adapted to configure the communications interface to facilitate operations associated with the previous carrier identity.

18. The method of claim 11, wherein determining the carrier identity from the subscription module comprises: determining the carrier identity from the subscription module when the access terminal is powered ON.

19. The method of claim 11, wherein selecting the modem configuration comprising the software image associated with the carrier identity from modem configuration data stored on the storage medium comprises: selecting, from the modem configuration data, the software image and a software configuration associated with the carrier identity, wherein the software image is separate from the software configuration.

20. The method of claim 11, wherein activating the selected modem configuration to configure the communications interface to facilitate operations associated with the carrier identity comprises: activating the selected modem configuration to configure the communications interface to operate with a carrier associated with the carrier identity.

21. An access terminal, comprising:
- means for determining a first carrier identity from a first subscription module upon determining that a wireless service provider autoselection feature is enabled;
- means for selecting a first modem configuration comprising a hardware configuration and a carrier-specific software image associated with the first carrier identity from modem configuration data stored on a storage medium;
- means for selecting a default modem configuration when no modem configuration associated with the first carrier identity is located; and
- means for activating the selected modem configuration to configure a communications interface according to the hardware configuration to operate with a carrier associated with the first carrier identity.

22. The access terminal of claim 21, wherein the first carrier identity comprises an Issuer Identification Number (IIN) included in an Integrated Circuit Card Identifier (ICCID) of the first subscription module.

23. The access terminal of claim 21, wherein the first carrier identity comprises a mobile country code (MCC) and a mobile network code (MNC) associated with a Public Land Mobile Network Identifier (PLMNID) of the first subscription module.

24. The access terminal of claim 21, wherein the first carrier identity comprises an International Mobile Subscriber Identity (IMSI) associated with the first subscription module.

25. The access terminal of claim 21, wherein the first modem configuration comprises: the carrier-specific software image and a carrier-specific software configuration, wherein the carrier-specific software image is separate from the carrier-specific software configuration.

26. The access terminal of claim 21, further comprising:
- means for determining that the first subscription module has been replaced with a second subscription module including a second carrier identity that is different from the first carrier identity;
- means for selecting a second modem configuration associated with the second carrier identity from the modem configuration data; and
- means for activating the second modem configuration as a replacement for the first modem configuration to configure the communications interface to operate with a carrier associated with the second carrier identity.

27. The access terminal of claim 26, wherein the first subscription module is replaced with the second subscription module when the access terminal is powered OFF, and the determination that the first subscription module has been replaced with the second subscription module occurs when the access terminal is powered back ON.

28. The access terminal of claim 26, wherein the first subscription module is replaced with the second subscription module during a run-time operation when the access terminal is powered ON, and the determination that the first subscription module has been replaced with the second subscription module occurs during the run-time operation.

29. A non-transitory processor-readable storage medium, comprising programming for causing a processing circuit to:
   determine a carrier identity from a subscription module upon determining that a wireless service provider autoselection feature is enabled;
   select a modem configuration comprising a hardware configuration and a carrier-specific software image associated with the carrier identity from modem configuration data stored on a storage medium;
   select a default modem configuration when no modem configuration associated with the carrier identity is located; and
   activate the selected modem configuration to configure a communications interface according to the hardware configuration to facilitate operations associated with the carrier identity.

30. The non-transitory processor-readable storage medium of claim 29, wherein the carrier identity comprises:
   an Issuer Identification Number (IIN) included in an Integrated Circuit Card Identifier (ICCID) of the subscription module;
   a Public Land Mobile Network Identifier (PLMNID) of the subscription module, the PLMNID including a mobile country code (MCC) and a mobile network code (MNC);
   an International Mobile Subscriber Identity (IMSI) associated with the subscription module; or
   a combination of two or more of the IIN, the PLMNID, and the IMSI.

31. The non-transitory processor-readable storage medium of claim 29, wherein the determination of the carrier identity from the subscription module comprises a determination that the subscription module has replaced a previous subscription module, and that the carrier identity from the subscription module is different from a previous carrier identity in the previous subscription module.

32. The non-transitory processor-readable storage medium of claim 31, wherein the selected modem configuration is activated by replacing at least a portion of a previous modem configuration with the selected modem configuration, wherein the previous modem configuration is adapted to configure the communications interface to facilitate operations associated with the previous carrier identity.

33. The non-transitory processor-readable storage medium of claim 29, wherein the modem configuration comprises: the carrier-specific software image and a carrier-specific software configuration, wherein the carrier-specific software image is separate from the carrier-specific software configuration.

* * * * *